United States Patent
Kato

(10) Patent No.: US 12,522,237 B2
(45) Date of Patent: Jan. 13, 2026

(54) OPERATION APPARATUS FOR VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 16 days.

(21) Appl. No.: 18/786,798

(22) Filed: Jul. 29, 2024

(65) Prior Publication Data

US 2025/0050899 A1 Feb. 13, 2025

(30) Foreign Application Priority Data

Aug. 9, 2023 (JP) ................. 2023-130498

(51) Int. Cl.
*B60W 50/14* (2020.01)
*B60W 30/182* (2020.01)
*B60W 50/00* (2006.01)

(52) U.S. Cl.
CPC .......... *B60W 50/14* (2013.01); *B60W 30/182* (2013.01); *B60W 2050/0062* (2013.01); *B60W 2050/146* (2013.01)

(58) Field of Classification Search
CPC ............... B60W 50/14; B60W 30/182; B60W 2050/0062; B60W 2050/146
See application file for complete search history.

(56) References Cited

FOREIGN PATENT DOCUMENTS

JP 2022153738 A * 10/2022

OTHER PUBLICATIONS

Mizuno, English translation of "JP 2022-153738 A", Oct. 13, 2022, Espacenet (Year: 2022).*

* cited by examiner

*Primary Examiner* — Naeem Taslim Alam
(74) *Attorney, Agent, or Firm* — Rimon P.C.

(57) ABSTRACT

An operation apparatus for a vehicle includes a first acquirer, a second acquirer, a controller, and a notifier. The first acquirer is configured to acquire, in a driving operation mode, an operation state of an operation member of the vehicle. The second acquirer is configured to acquire, in a game operation mode, the operation state of the operation member. The controller is configured to perform a control on switching of an operation mode. The notifier is configured to notify a driver who drives the vehicle of information on a deviation between the operation state of the operation member acquired by the second acquirer and the operation state of the operation member acquired by the first acquirer, when the controller causes the operation mode to be switched from the game operation mode to the driving operation mode.

4 Claims, 5 Drawing Sheets

OPERATION APPARATUS FOR VEHICLE

CROSS-REFERENCE TO RELATED APPLICATIONS

The present application claims priority from Japanese Patent Application No. 2023-130498 filed on Aug. 9, 2023, the entire contents of which are hereby incorporated by reference.

BACKGROUND

The disclosure relates to an operation apparatus for a vehicle.

In recent years, a vehicle has been widely used that includes a steer-by-wire adapted to control, based on an electric signal, a steering angle of a wheel without mechanically coupling a steering wheel and the wheel.

With the spread of the vehicle that includes the steer-by-wire adapted to control the steering angle of the wheel based on the electric signal, a technique has been proposed, for example, of enjoying a content such as a game in a vehicle compartment by operating an operation member such as the steering wheel.

For example, Japanese Unexamined Patent Application Publication (JP-A) No. 2022-153738 discloses a technique in which a game operation mode enabling a content operation by an operation of the operation member and a driving operation mode enabling a driving operation of a vehicle by an operation of the operation member are switched and in which a content such as the game is provided, in the vehicle compartment, to a driver who drives the vehicle.

SUMMARY

An aspect of the disclosure provides an operation apparatus for a vehicle. The operation apparatus includes a first acquirer, a second acquirer, a controller, and a notifier. The first acquirer is configured to acquire, in a driving operation mode, an operation state of an operation member of the vehicle. The driving operation mode is configured to acquire an operation of the operation member as a driving operation. The second acquirer is configured to acquire, in a game operation mode, the operation state of the operation member. The game operation mode is configured to acquire the operation of the operation member as a game operation of a content. The controller is configured to perform a control on switching of an operation mode. The notifier is configured to notify a driver who drives the vehicle of information on a deviation between the operation state of the operation member acquired by the second acquirer and the operation state of the operation member acquired by the first acquirer, when the controller causes the operation mode to be switched from the game operation mode to the driving operation mode.

An aspect of the disclosure provides an operation apparatus for a vehicle. The operation apparatus includes one or more processors and one or more memories communicably coupled to the one or more processors. The one or more processors are configured to: acquire, in a driving operation mode, an operation state of an operation member of the vehicle, in which the driving operation mode is configured to acquire an operation of the operation member as a driving operation; acquire, in a game operation mode, the operation state of the operation member, in which the game operation mode is configured to acquire the operation of the operation member as a game operation of a content; and notify a driver who drives the vehicle of information on a deviation between the operation state of the operation member acquired in the game operation mode and the operation state of the operation member acquired in the driving operation mode, when switching the operation mode from the game operation mode to the driving operation mode.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
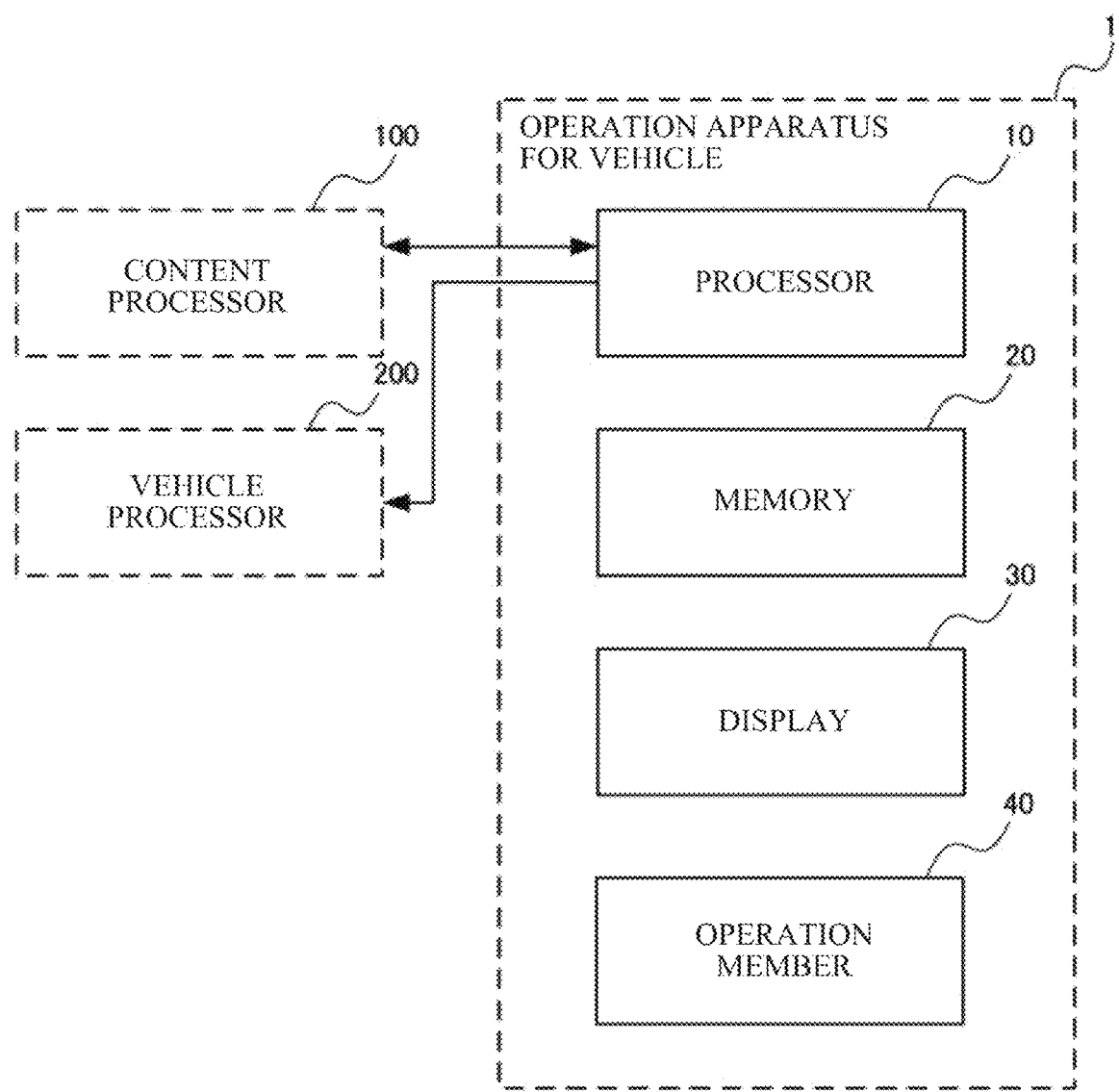
FIG. 1 is a diagram illustrating a configuration of an operation apparatus for a vehicle according to one example embodiment of the disclosure.

A technique disclosed in JP-A No. 2022-153738 does not perform a control of a steering angle that is based on a steering operation, when an operation mode is switched to a game operation mode and the steering operation is performed. Accordingly, a deviation can occur between a current steering angle of a wheel and a current operation state of a steering wheel.

In addition, the technique disclosed in JP-A No. 2022-153738 does not notify a driver who drives a vehicle of an occurrence of the deviation, upon starting the driving of the vehicle by switching the operation mode from the game operation mode to the driving operation mode. Accordingly, for example, the vehicle can travel in a direction unintended by the driver, raising a concern that the driving may not possibly be started safely.

It is desirable to provide an operation apparatus for a vehicle which makes it possible to start the driving of the vehicle safely when an operation mode is switched from a game operation mode to a driving operation mode.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

An operation apparatus for a vehicle 1 according to an example embodiment will be described with reference to FIGS. 1 to 5. Hereinafter, the operation apparatus for the vehicle 1 is simply referred to as an "operation apparatus 1".

[Configuration of Operation Apparatus 1]

Referring to FIG. 1, the operation apparatus 1 according to the example embodiment may include a processor 10, a memory 20, a display 30, and an operation member 40.

In the example embodiment, the processor 10 may detect, for example, an operation state of the operation member 40.

The processor 10 may transmit the detected operation state of the operation member 40 to a content processor 100 or a vehicle processor 200.

In some embodiments, the operation member 40 may include at least a steering wheel, a brake pedal, an accelerator pedal, and a shift lever.

A configuration of the processor 10 will be described later.

The content processor 100 may execute a program of any content such as a game.

The content processor 100 may execute the program, based on the operation state of the operation member 40 received from the processor 10.

The content processor 100 may execute the program such as a racing game, based on the operation state of the operation member 40 including, for example, the steering wheel and the brake pedal received from the processor 10.

In the example embodiment, the content processor 100 may transmit, to the processor 10, data indicating that the program of the content is to be started, upon starting the program of the content.

In the example embodiment, the content processor 100 may transmit, to the processor, data indicating that the program of the content is to be ended, upon ending the program of the content.

The vehicle processor 200 may perform a travel control of the vehicle, based on the operation state of the operation member 40 received from the processor 10.

The vehicle processor 200 may perform the travel control of the vehicle, based on the operation state of the operation member 40 including, for example, the steering wheel and the brake pedal received from the processor 10.

The memory 20 may include a read-only memory (ROM) and a random-access memory (RAM) which are not illustrated.

The memory 20 may store, for example, a control program and various pieces of data received from the processor 10.

The display 30 may be any display panel such as a liquid crystal display. The display 30 may display information received from the processor 10.

[Configuration of Processor 10]

Figure 2:
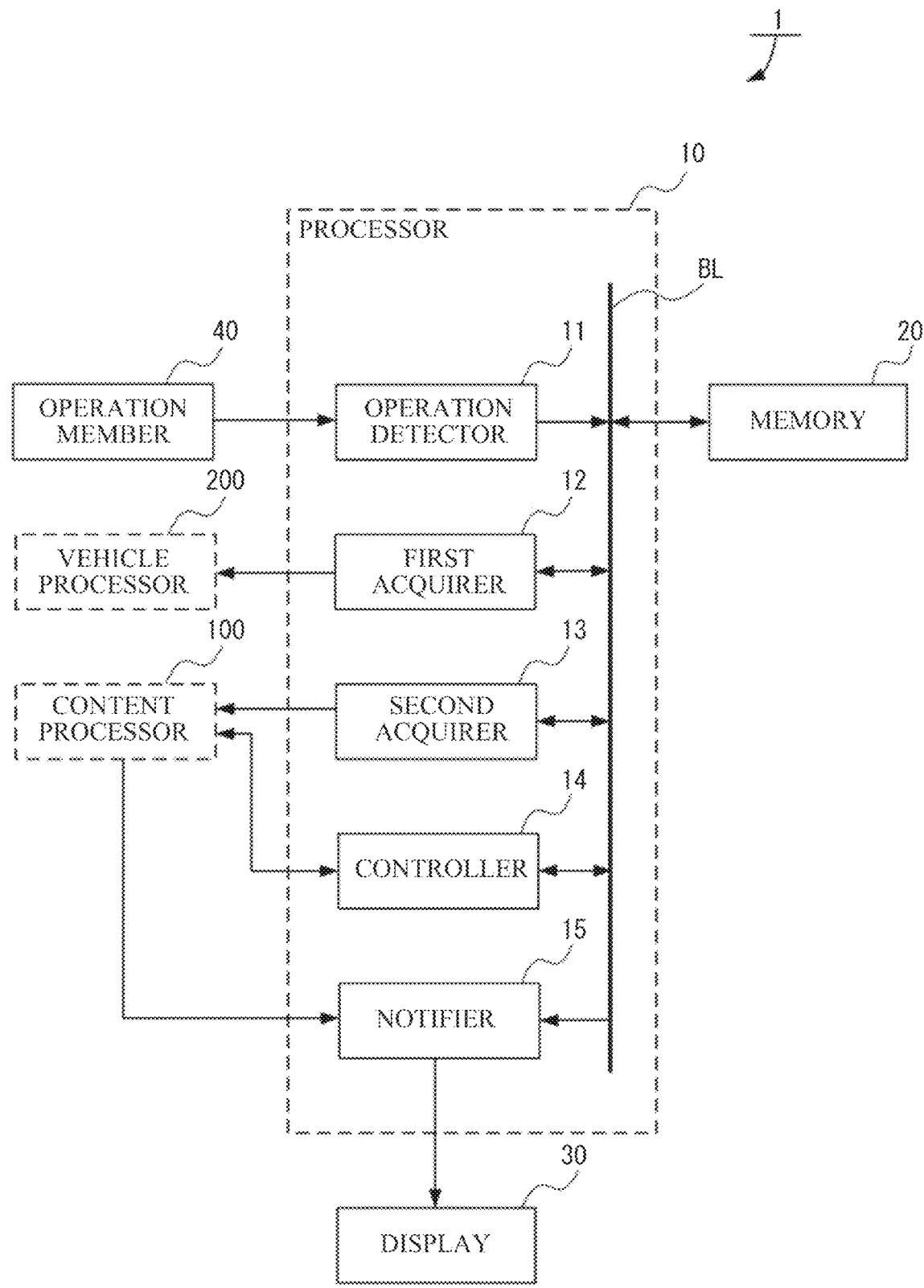
FIG. 2 is a diagram illustrating a configuration of a processor of the operation apparatus for the vehicle illustrated in FIG. 1.

Referring to FIG. 2, the processor 10 may include an operation detector 11, a first acquirer 12, a second acquirer 13, a controller 14, and a notifier 15.

The respective parts of the processor 10 and the memory 20 may transmit and receive various pieces of data via a bus line BL.

The operation detector 11 may detect the operation state of the operation member 40 of the vehicle.

The operation detector 11 may detect a current operation state of the operation member 40, based on, for example, an output of a sensor provided in the operation member 40.

The operation detector 11 may detect a turning steering angle of the steering wheel, based on, for example, an output of a steering angle sensor provided in the steering wheel of the vehicle.

The operation detector 11 may detect operation positions of the respective accelerator pedal and brake pedal, based on, for example, outputs of respective position sensors provided in the accelerator pedal and the brake pedal.

The operation detector 11 may detect an operation position of the shift lever based on, for example, an output of a switch provided in the shift lever.

The operation detector 11 may transmit, via the bus line BL, the detected operation state of the operation member 40 to the first acquirer 12 and the second acquirer 13 that are described later.

The first acquirer 12 acquires the operation state of the operation member 40 in a driving operation mode. The driving operation mode is configured to acquire an operation of the operation member 40 of the vehicle as a driving operation.

For example, when the first acquirer 12 receives, from the later-described controller 14, data indicating that an operation mode is to be switched from a game operation mode to a driving operation mode, the first acquirer 12 may acquire the operation state of the operation member 40 received from the operation detector 11 as the driving operation.

The first acquirer 12 may transmit the acquired operation state of the operation member 40 to the vehicle processor 200.

The first acquirer 12 may transmit, via the bus line BL, the acquired operation state of the operation member 40 to the controller 14 and the notifier 15 that are described later.

In one example, when the first acquirer 12 receives, from the later-described controller 14, data indicating that the operation mode is to be switched from the driving operation mode to the game operation mode, the first acquirer 12 may stop the acquisition of the operation state of the operation member 40.

In one example, when the first acquirer 12 receives, from the later-described controller 14, data indicating that the operation mode is to be switched from the driving operation mode to the game operation mode, the first acquirer 12 may continuously transmit, to the controller 14 and the notifier 15 that are described later, the operation state of the operation member 40 acquired immediately before the acquisition of the operation state of the operation member 40 is stopped.

The second acquirer 13 acquires the operation state of the operation member 40 in the game operation mode. The game operation mode is configured to acquire the operation of the operation member 40 of the vehicle as a game operation of the content.

For example, when the second acquirer 13 receives, from the later-described controller 14, data indicating that the operation mode is to be switched from the driving operation mode to the game operation mode, the second acquirer 13 may acquire the operation state of the operation member 40 received from the operation detector 11 as the game operation.

The second acquirer 13 may transmit the acquired operation state of the operation member 40 to the content processor 100.

The second acquirer 13 may transmit, via the bus line BL, the acquired operation state of the operation member 40 to the controller 14 and the notifier 15 that are described later.

In one example, when the second acquirer 13 receives, from the later-described controller 14, data indicating that the operation mode is to be switched from the game operation mode to the driving operation mode, the second acquirer 13 may stop the acquisition of the operation state of the operation member 40.

The controller 14 may control the operation apparatus 1 as a whole, based on the control program stored in the memory 20.

For example, the controller 14 may determine whether the vehicle is in a state in which the vehicle is not traveling, i.e., a non-traveling state.

In one example, the controller 14 may determine whether the vehicle is in the non-traveling state, based on a vehicle speed pulse.

In the example embodiment, the controller 14 performs a control on the switching of the operation mode.

The controller 14 may transmit data on the switching of the current operation mode to the first acquirer 12 and the second acquirer 13.

For example, the controller 14 may transmit, to the first acquirer 12, the second acquirer 13, and the content processor 100, the data indicating that the operation mode is to be switched from the driving operation mode to the game operation mode, when: the controller 14 receives, from the content processor 100, data indicating that the execution of the program of the content is to be started; and determines that the vehicle is in the non-traveling state.

In some embodiments, the controller 14 may perform the control of switching the operation mode from the game operation mode to the driving operation mode, when the deviation between the operation state of the operation member 40 acquired by the first acquirer 12 and the operation state of the operation member 40 acquired by the second acquirer 13 is confirmed as being reduced or not present.

For example, when the controller 14 has confirmed that there is no deviation between the operation state of the operation member 40 received from the second acquirer 13 and the operation state of the operation member 40 acquired by the first acquirer 12, the controller 14 may transmit, to the first acquirer 12 and the second acquirer 13, the data indicating that the operation mode is to be switched from the game operation mode to the driving operation mode.

The notifier 15 notifies a driver who drives the vehicle of information on the deviation between the operation state of the operation member 40 acquired by the second acquirer 13 and the operation state of the operation member 40 acquired by the first acquirer 12, when the operation mode is to be switched from the game operation mode to the driving operation mode.

In some embodiments, when the notifier 15 has received, from the content processor 100, data indicating that the program of the content is to be ended, the notifier 15 may visualize the data on the deviation between the operation state of the operation member 40 received from the second acquirer 13 and the operation state of the operation member 40 received from the first acquirer 12, and cause the display 30 to display the data in the form of information.

Figure 3:
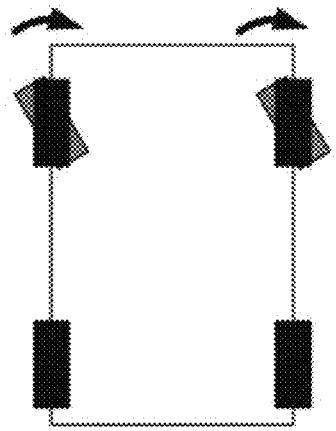
FIG. 3 is a diagram illustrating a display example of the operation apparatus for the vehicle illustrated in FIG. 1.

Referring to FIG. 3, the notifier 15 may cause the display 30 to display, for example, an animation indicating the deviation between the turning steering angle of the steering wheel received from the second acquirer 13 and the turning steering angle of the steering wheel received from the first acquirer 12.

For example, the notifier 15 may cause the display 30 to display instruction information such as "turn the steering wheel to the right so that pictures of front wheels overlap with each other."

When there is the deviation between the operation state of the shift lever received from the second acquirer 13 and the operation state of the shift lever received from the first acquirer 12, the notifier 15 may cause the display 30 to display, for example, instruction information such as "set the shift lever to the P range".

The notifier 15 may cause the display 30 to display an indicator such as a check mark as illustrated in FIG. 3, when it is confirmed that the deviation between the operation state received from the second acquirer 13 and the operation state of the operation member 40 received from the first acquirer 12 is reduced or not present.

[Processes of Operation Apparatus 1]

Example processes of the operation apparatus 1 upon switching the operation mode will be described with reference to FIGS. 4 and 5.

[Processes of Switching from Driving Operation Mode to Game Operation Mode]

Example processes of the operation apparatus 1 when the operation mode is to be switched from the driving operation mode to the game operation mode will be described with reference to FIG. 4.

Figure 4:
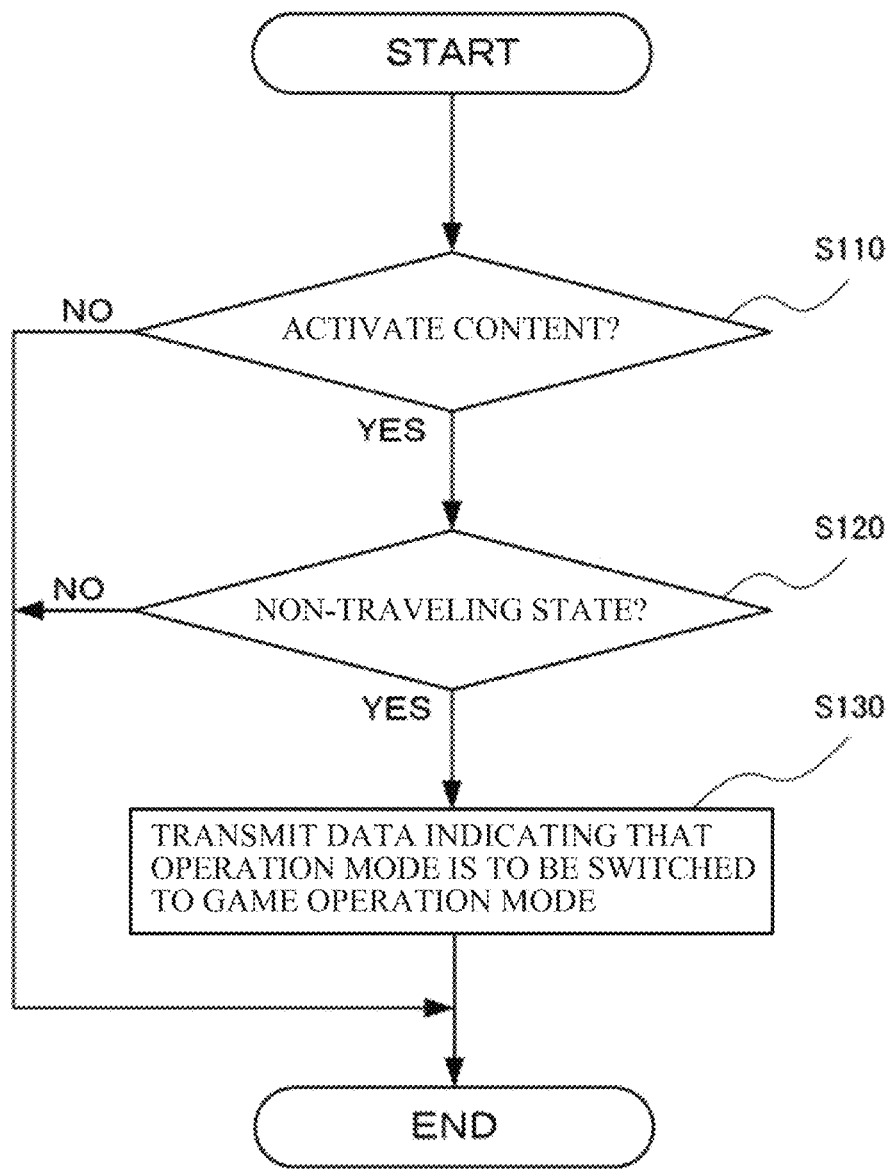
FIG. 4 is a diagram illustrating a flow of processes of the operation apparatus for the vehicle illustrated in FIG. 1.
Figure 5:
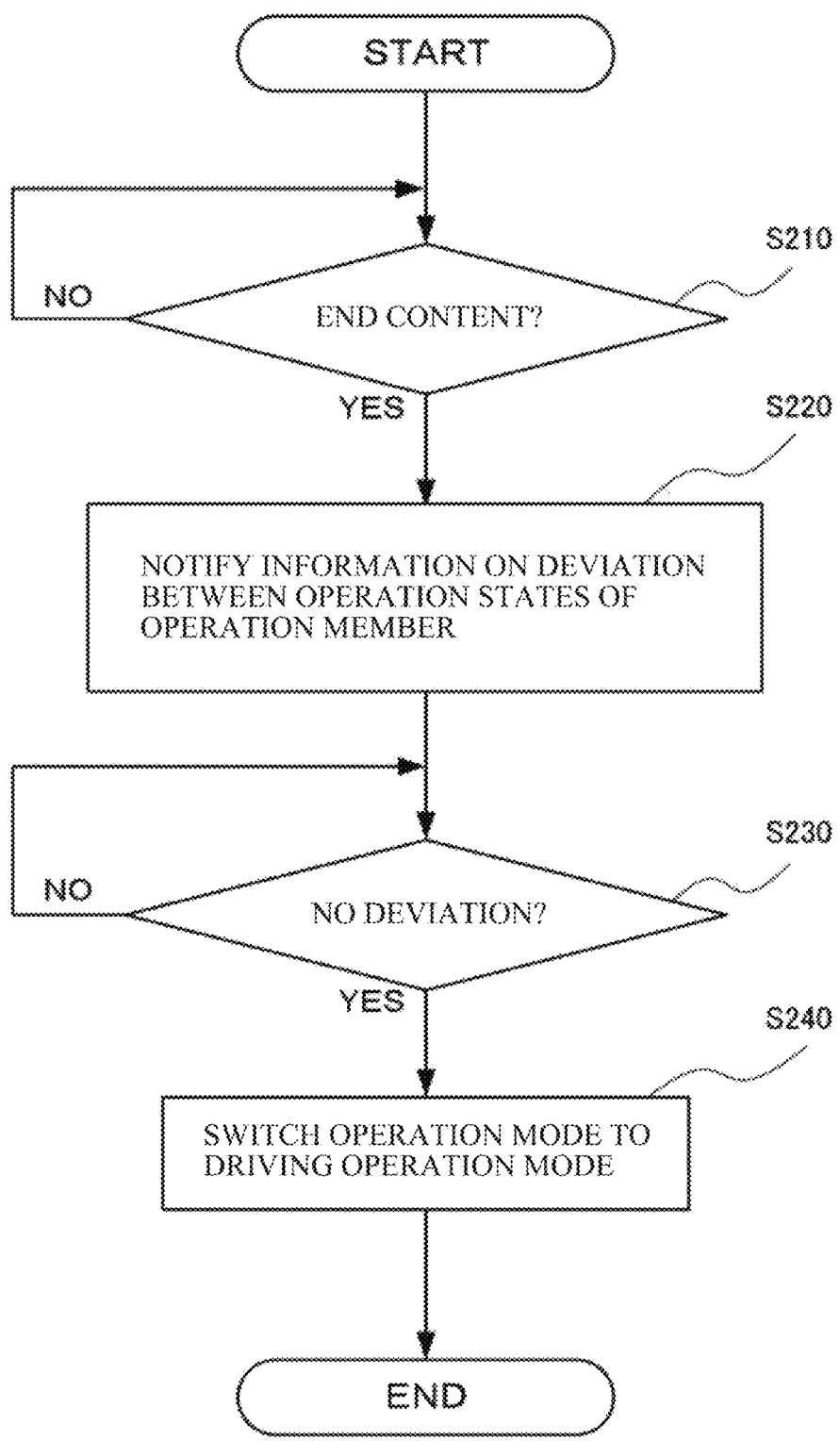
FIG. 5 is a diagram illustrating a flow of processes of the operation apparatus for the vehicle illustrated in FIG. 1.

Referring to FIG. 4, the controller 14 may determine whether the data indicating that the content program is to be activated is received from the content processor 100 (step S110).

If the controller 14 determines that the data indicating that the program of the content is to be activated is not received from the content processor 100 ("NO" in step S110), the process may be ended.

If the controller 14 determines that the data indicating that the program of the content is to be activated is received from the content processor 100 ("YES" in step S110), the processes may proceed to step S120.

The controller 14 may determine whether the vehicle is in the non-traveling state (step S120).

If the controller 14 determines that the vehicle is not in the non-traveling state ("NO" in step S120), the processes may be ended.

If the controller 14 determines that the vehicle is in the non-traveling state ("YES" in step S120), the controller 14 may transmit, to the first acquirer 12, the second acquirer 13, and the content processor 100, the data indicating that the operation mode is to be switched from the driving operation mode to the game operation mode (step S130), and end the processes.

[Processes of Switching from Game Operation Mode to Driving Operation Mode]

Example processes of the operation apparatus 1 when the operation mode is to be switched from the game operation mode to the driving operation mode will be described with reference to FIG. 5.

The controller 14 may determine whether the data indicating that the program of the content is to be ended is received from the content processor 100 (step S210).

If the controller 14 determines that the data indicating that the program of the content is to be ended is received from the content processor 100 ("NO" in step S210), the process may return to a standby mode.

If the controller 14 determines that the data indicating that the content program is to be ended is received from the content processor 100 ("YES" in step S210), the notifier 15 may cause the display 30 to display the information on the deviation between the operation state of the operation member 40 received from the second acquirer 13 and the operation state of the operation member 40 received from the first acquirer 12 (step S220).

The controller 14 may determine whether there is the deviation between the operation state of the operation member 40 received from the second acquirer 13 and the operation state of the operation member 40 received from the first acquirer 12 (step S230).

If the controller 14 determines that there is the deviation between the operation state of the operation member 40 received from the second acquirer 13 and the operation state of the operation member 40 received from the first acquirer 12 ("NO" in step S230), the controller 14 may return the process and shift the processes to the standby state.

If the controller 14 determines that there is no deviation between the operation state of the operation member 40 received from the second acquirer 13 and the operation state of the operation member 40 received from the first acquirer 12 ("YES" in step S230), the controller 14 may transmit, to the first acquirer 12 and the second acquirer 13, the data indicating that the operation mode is to be switched from the game operation mode to the driving operation mode (step S240), and end the processes.

Workings and Example Effects

The operation apparatus 1 according to the example embodiment includes the first acquirer 12, the second acquirer 13, the controller 14, and the notifier 15. The first acquirer 12 is configured to acquire, in the driving operation mode, the operation state of the operation member 40 of the vehicle. The driving operation mode is configured to acquire the operation of the operation member 40 as the driving operation. The second acquirer 13 is configured to acquire, in the game operation mode, the operation state of the operation member 40. The game operation mode is configured to acquire the operation of the operation member 40 of the vehicle as the game operation of the content. The controller 14 is configured to perform a control on switching of the operation mode. The notifier 15 is configured to notify the driver who drives the vehicle of the information on the deviation between the operation state of the operation member 40 acquired by the second acquirer 13 and the operation state of the operation member 40 acquired by the first acquirer 12, when the operation mode is to be switched from the game operation mode to the driving operation mode.

For example, when the operation mode is to be switched from the game operation mode to the driving operation mode, the notifier 15 notifies the driver of the vehicle of the information on the deviation between the operation state of the operation member 40 received from the second acquirer 13 and the operation state of the operation member 40 received from the first acquirer 12.

In some embodiments, when the operation mode is to be switched from the game operation mode to the driving operation mode, the notifier 15 may cause the display 30 to display the information on deviation between the operation state of the operation member 40 at the time when the operation mode is switched from the driving operation mode to the game operation mode and the current operation state of the operation member 40.

This configuration helps to allow the driver to recognize the deviation between the operation state of the operation member 40 at the time when the operation mode is switched from the driving operation mode to the game operation mode and the current operation state of the operation member 40.

In some embodiments, the notifier 15 may cause the display 30 to display an operation instruction directed to a reduction or an elimination of the deviation between the operation state acquired by the second acquirer 13 and the operation state of the operation member 40 acquired by the first acquirer 12.

Thus, the notifier 15 may visualize the deviation between the operation state of the operation member 40 at the time when the operation mode is switched from the driving operation mode to the game operation mode and the current operation state of the operation member 40, and display the visualized deviation on the display 30.

This configuration helps to make it easier for the driver to reduce or eliminate the deviation between the operation state of the operation member 40 at the time when the operation mode is switched from the driving operation mode to the game operation mode and the current operation state of the operation member 40.

In some embodiments, the operation member 40 may include at least the steering wheel, the accelerator pedal, the brake pedal, and the shift lever.

For example, the operation apparatus 1 may detect the operation states of the steering wheel, the accelerator pedal, the brake pedal, and the shift lever to allow the driver to safely start the traveling.

In some embodiments, the operation apparatus 1 may visualize the deviation between the operation states thereof at the time when the operation mode is switched from the driving operation mode to the game operation mode and the current operation states thereof, and display the visualized deviation on the display 30.

This configuration helps to make it easier for the driver to reduce or eliminate the deviation between the operation state of the operation member 40 at the time when the operation mode is switched from the driving operation mode to the game operation mode and the current operation state of the operation member 40, and to safely start the traveling accordingly.

In some embodiments, the controller 14 may perform the control of switching the operation mode from the game operation mode to the driving operation mode, when the deviation between the operation state of the operation member 40 acquired by the second acquirer 13 and the operation state of the operation member 40 acquired by the first acquirer 12 is confirmed as being reduced or not present.

This configuration helps to allow the driver to safely start the driving of the vehicle.

Modification Example

In some embodiments, the controller 14 of the operation apparatus 1 according to the example embodiment may switch the operation mode from the game operation mode to the driving operation mode, when: the deviation between the operation state of the operation member 40 acquired by the second acquirer 13 and the operation state of the operation member 40 acquired by the first acquirer 12 is confirmed as being reduced or not present; and a safety around the vehicle is confirmed based on an output such as a captured image of the surroundings of the vehicle or outputs of various sensors.

This configuration helps to allow the driver to safely start the driving of the vehicle.

In some embodiments, it is possible to implement the operation apparatus 1 of the example embodiment of the disclosure by recording the process to be executed by a processor such as the controller 14 and the notifier 15 on a non-transitory recording medium readable by a computer system, and causing the computer system to load the program recorded on the non-transitory recording medium onto the memory to execute the program.

The computer system as used herein may encompass an operating system (OS) and a hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

According to at least one embodiment of the disclosure, it is possible to start the driving of the vehicle safely when the operation mode is switched from the game operation mode to the driving operation mode, by notifying the driver who drives the vehicle of the information on the deviation between the operation state of the operation member acquired in the game operation mode and the operation state of the operation member acquired in the driving operation mode.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 10 illustrated in FIG. 1.

The invention claimed is:

1. An operation apparatus for a vehicle, the operation apparatus comprising:
    a first acquirer configured to acquire, in a driving operation mode, an operation state of an operation member of the vehicle, the driving operation mode being configured to acquire an operation of the operation member as a driving operation;
    a second acquirer configured to acquire, in a game operation mode, the operation state of the operation member, the game operation mode being configured to acquire the operation of the operation member as a game operation of a content;
    a controller configured to perform a control on switching of an operation mode; and
    a notifier configured to notify a driver who drives the vehicle of information on a deviation between the operation state of the operation member acquired by the second acquirer and the operation state of the operation member acquired by the first acquirer, when the controller causes the operation mode to be switched from the game operation mode to the driving operation mode.

2. The operation apparatus for the vehicle according to claim 1, wherein the operation member comprises at least a steering wheel, an accelerator pedal, a brake pedal, and a shift lever.

3. The operation apparatus for the vehicle according to claim 2, wherein the controller is configured to perform the control of switching the operation mode from the game operation mode to the driving operation mode, when the deviation between the operation state of the operation member acquired by the second acquirer and the operation state of the operation member acquired by the first acquirer is confirmed as being reduced or not present.

4. An operation apparatus for a vehicle, the operation apparatus comprising:
    one or more processors; and
    one or more memories communicably coupled to the one or more processors, wherein
    the one or more processors are configured to
        acquire, in a driving operation mode, an operation state of an operation member of the vehicle, the driving operation mode being configured to acquire an operation of the operation member as a driving operation,
        acquire, in a game operation mode, the operation state of the operation member, the game operation mode being configured to acquire the operation of the operation member as a game operation of a content, and
        notify a driver who drives the vehicle of information on a deviation between the operation state of the operation member acquired in the game operation mode and the operation state of the operation member acquired in the driving operation mode, when switching the operation mode from the game operation mode to the driving operation mode.

* * * * *